Aug. 9, 1938.                H. S. JANDUS                2,126,393
                             HAND BRAKE LEVER
                           Filed April 1, 1937
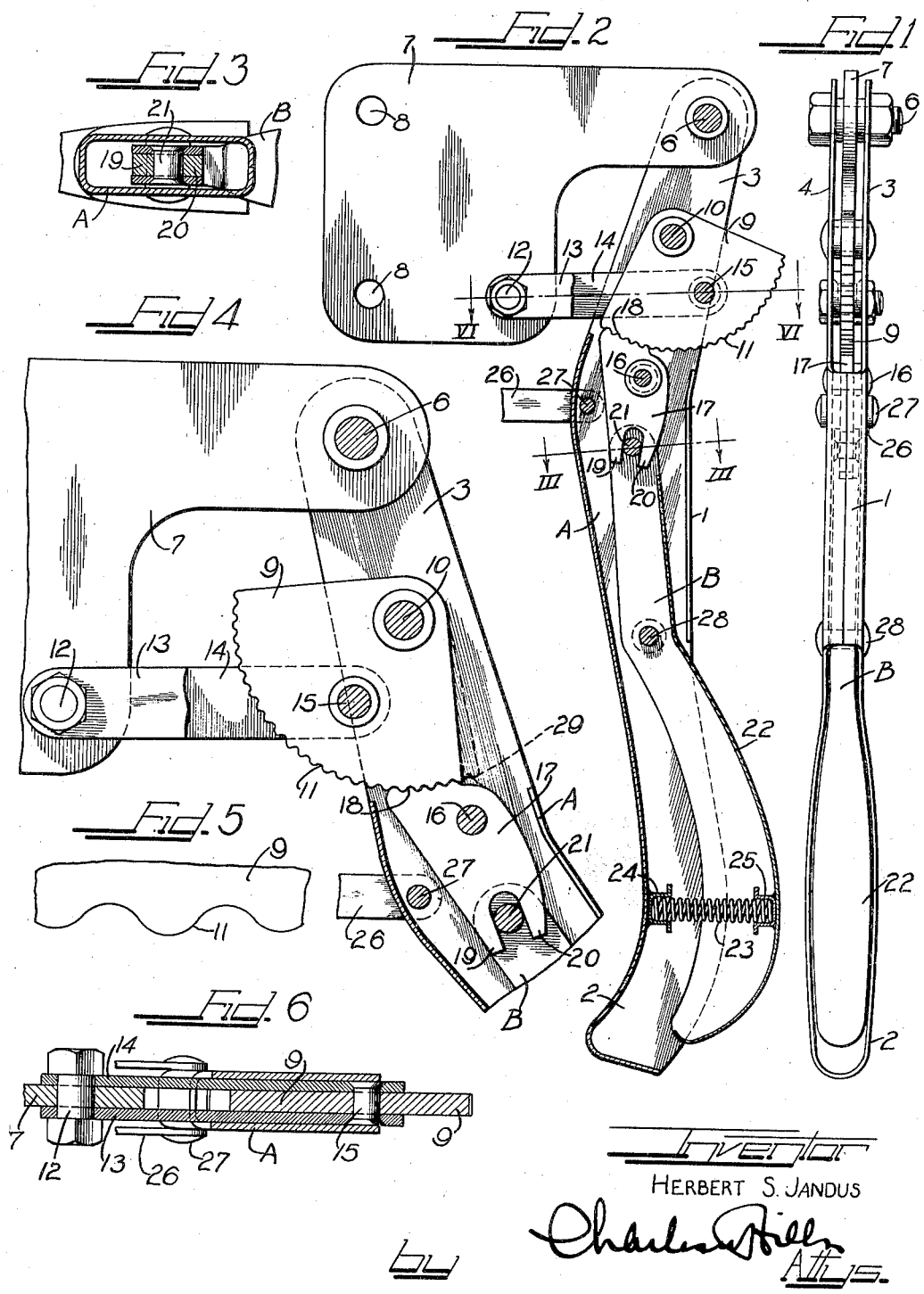
Inventor
HERBERT S. JANDUS Patented Aug. 9, 1938

2,126,393

UNITED STATES PATENT OFFICE 2,126,393

HAND BRAKE LEVER

Herbert S. Jandus, Detroit, Mich., assignor to Oakes Products Corporation, Detroit, Mich., a corporation of Michigan Application April 1, 1937, Serial No. 134,211

5 Claims. (Cl. 74—536)

The present invention relates to a hand brake lever, and more particularly to a construction thereof whereby the cooperating teeth on the ratchet member and pawl have rounded crests so that the pitch of the teeth may be reduced to a minimum and that sharply pointed teeth may be eliminated.

The brake lever of the present invention contemplates a ratchet sector which is pivotally mounted on the lever for cooperating with a pivotally mounted pawl, also on the lever, with the pawl provided with a concave surface in which are formed teeth for engaging the teeth on the ratchet sector. The relationship of the series of teeth on the pawl is so designed that when assembled the first tooth of the series is offset with respect to a line through the centers of pivotal movement of the ratchet sector and pawl thus causing the sector and pawl to cooperate with toggle-like action. The arrangement of the pawl and ratchet sector to cooperate with toggle-like action makes it possible to swing the lever to set position with a minimum of noise occasioned by the passage of the teeth of the pawl over the teeth of the sector and at the same time accomplishes full meshing engagement between the teeth of the pawl and ratchet when the lever tends to move in retrograde direction, that is, in a direction toward "off" position.

An object of the present invention is to provide a ratchet type brake lever construction with the teeth of the ratchet and pawl rounded to effect perfect meshing.

Another object of the present invention is to provide a ratchet type brake lever with the pawl equipped with a series of teeth, and wherein the crests of the teeth on the pawl and the ratchet are rounded to reduce the pitch of the teeth to a minimum amount and at the same time effective to create positive latching action between the pawl and ratchet.

A further object of the present invention is to provide a brake lever construction having a swingable ratchet sector with a connection thereto to cause the sector to swing in angular direction counter to the direction of angular swing of the lever to thereby cause the pawl to ride over the teeth of the ratchet and, after the lever has been moved in force applying direction, to cause positive meshing engagement of the ratchet and pawl when the lever tends to move in retrograde direction.

Another and still further object of the present invention is to provide a brake lever construction having a pawl, and a ratchet sector, pivoted to the lever in such manner as to cooperate with toggle-like action to permit swing of the lever in force applying direction and to positively engage to prevent swing of the lever in retrograde direction.

The invention has for a further object the provision of a ratchet sector, for brake levers, so constructed that the manufacturing cost thereof is reduced to a minimum.

The invention has a still further object in providing a brake lever construction employing a pivoted ratchet sector and pawl, in which the teeth on the pawl are so disposed with respect to the center of pivotal movement of the sector as to cause positive meshing engagement between the two when the lever tends to retrograde movement.

A still further object of the present invention is to improve brake lever construction to provide highly efficient latching engagement and to reduce the cost of manufacture.

The above other and further objects of the present invention will be apparent from the following description and accompanying drawing.

The accompanying drawing illustrates a brake lever constructed in accordance with the principles of the present invention and the views thereof are as follows:

Figure 1 is an elevational view of a lever of the present invention arranged as a lever of the dash type.

Figure 2 is a view, partially in side elevation and partially in central section, through the lever of Figure 1 and showing the relationship of the parts when the lever is in its normal or "off" position.

Figure 3 is an enlarged transverse sectional view taken in the plane indicated by line III—III of Figure 2.

Figure 4 is a fragmental, enlarged view, partially in elevation and partially in section, showing the relationship of the parts when the lever is in "set" position.

Figure 5 is a fragmental elevational view of a portion of the sector teeth, enlarged eight times, illustrating the preferred contour of the teeth.

Figure 6 is an enlarged transverse sectional view taken substantially in the plane indicated by the line VI—VI of Figure 2.

The drawing will now be explained:

The lever herein illustrated includes a lever proper A fashioned from flat sheet metal so stamped and formed as to provide a central tubular portion 1, a channel shaped handle portion 2 and parallel spaced legs 3 and 4 at the end of the body opposite the handle end.

The lever is shown as mounted as one of the dash type, being pivoted by means of a suitable pin or bolt 6 to a plate support 7 which support is provided with apertures 8 for receiving attaching bolts or rivets to secure the support in place on an automotive vehicle behind the instrument board of the same.

A ratchet sector 9 is pivoted on a pin or bolt 10 to the legs 3 and 4 of the lever and is adapted to swing between the legs about its pivot. A surface of the ratchet sector is arcuately convex and is provided with a series of teeth 11.

Pivoted on a bolt or other pivot means 12 on a support are parallel arms 13 and 14 which straddle the ratchet sector 9 and are pivoted thereto at 15. The arms or connections 13 and 14 cause the ratchet sector to swing about its pivot in a direction counter to the direction of angular movement of the lever when the latter is swung in use.

The face of the pawl adjacent the sector is formed with an arcuately concave surface in which are teeth 18 forming a series. The opposite end of the pawl is bifurcated forming ears 19 and 20 to receive a pin 21 in sliding relationship.

A pawl release member B is fashioned from flat metal stock and is channel shaped in transverse section substantially throughout its length. The pawl release member B is arranged within the walls of the lever A to work between the walls of the same. The pawl release member B is provided with a hand engaging portion or handle 22 which is deflected out of the general direction of that portion of the member which is within the tubular body portion 1 of the lever so as to be accessible to the vehicle operator.

The pin 21 is carried by the pawl release member B to rock the pawl 17 about its pivot when it is desired to release the pawl from latching engagement with the ratchet sector 9.

In order to normally maintain the pawl in latched engagement with the ratchet sector, spring means may be interposed acting against the pawl release member B. Spring means herein disclosed comprises a coil spring 23 having its ends resting in cups 24 and 25 respectively which are welded or otherwise secured to the webs of the handle portions of the lever A and the pawl release member B, as may be observed in Figure 2. This spring is a light spring possessing just sufficient strength to normally urge the pawl into contact with the ratchet sector, and no more.

A clevis or yoke 26 is secured to the lever A by means of a connection, such as a pivot 27, and to this clevis or yoke is attached connection to the brake mechanism of a vehicle.

The contours of the teeth of the ratchet sector 9 and of the pawl 17 are corresponding and of the same pitch.

The portion of the ratchet sector teeth shown in Figure 5 show the crests and roots of the teeth as being rounded. This figure is drawn eight times the size of the teeth on the commercial form of the lever and represents a pitch of one-eighth inch with a tooth depth of $\frac{1}{32}$ of an inch. By making the teeth contoured as shown or of slightly modified shape while still maintaining the rounded crests, the teeth of the pawl mesh perfectly with the teeth of the ratchet sector. Furthermore by reason of this construction, the teeth of the pawl pass readily over the teeth of the sector as the lever is moved from "off" position to "set" position with minimum of noise.

Making the teeth of the sector and pawl with rounded crests makes it possible to broach these teeth inexpensively. It might possibly so happen that these teeth could be stamped, thus further reducing the cost of manufacture.

By constructing a pawl and ratchet sector as herein described, the sizes of the same may be maintained at a minimum, without affecting the positive latching engagement of the pawl with the ratchet sector when any strain is imposed on the lever to move it in retrograde direction.

Even with teeth of slight radial depth, as herein illustrated and described, if the contours are uniform and the teeth hardened, any tendency of the teeth to engage at their tips would be minimized. Even though the teeth accidentally engaged at their tips, any jar imposed on the lever would cause the teeth to mesh by snapping into full engagement.

A lever constructed with the teeth as herein illustrated and described is very easy to release as there is no appreciable back-pull on the lever when necessary to engage the pawl from the sector by manipulation of the pawl release member B.

It will be observed that the series of teeth of the pawl mesh with the series of teeth of the ratchet sector on the side of a line through the centers of pivotal movement of the pawl and ratchet sector, away from the direction of movement of the lever when swung to "set" position. The first tooth of the series of the pawl is spaced slightly from this line so that in effect the sector and pawl cooperate with toggle-like action.

When the lever is moved from "off" position, which is that of Figure 2, to "set" position, which is that of Figure 4, the ratchet sector is swung in clockwise direction thus tending to swing the upper end of the pawl to the left, as viewed in these figures, thus rolling or rocking the pawl about its pivot thereby disengaging the ratchet from latched engagement with the pawl, whereby the pawl rides over the ratchet. As soon as pulling pressure in this direction is released, any tendency imposed by the connected brake rigging to move the lever in retrograde direction will immediately tend to swing the ratchet sector in counterclockwise direction and rock or roll the pawl in clockwise direction, thus increasing the latching or binding effect between them, thereby positively latching the lever in its then position.

The arrangement of the connections 13 and 14 between the support 7 and the ratchet sector 9 as horizontal, causes swinging movement of the ratchet sector at a uniform rate so that increased efficient braking effect is the resultant.

While the pitch of the teeth has herein been specified as being one-eighth of an inch and the depth of the teeth as $\frac{1}{32}$ of an inch, it is to be understood that these sizes are not limitations, but represent substantially the most extreme condition of construction of a lever of this type.

The brake lever construction of the present invention will work as well as a lever of the regular type, that is, one which is pivoted at its lower end with the handle extending upwardly, or in any other position between the extremes of horizontal and vertical position.

The handle portion 2 of the lever A is reversely bent with respect to the direction of the length of the lever and curved in transverse section to afford a convenient and smooth grip for the vehicle operator. In like manner, the handle portion 22 of the pawl release member B is curved and rounded.

If back-pull is desired, it may be accomplished by extending the contact face of the pawl so that one or more of the teeth lie, when lever is in its normal or "off" position, beyond the line of centers of the pivots 10 and 16.

Indicated by dotted lines in Figure 4 is an additional tooth 29 as the first tooth of the pawl series. This tooth will, when lever is in "off" position, lie on or slightly to the right of the line through the centers 10 and 16 as shown in Figure 4.

If this were done the teeth to the left of the line of centers would be along an arc whose center is pivot 10 and the teeth to the right of the line of centers would be along an arc whose center is pivot 16.

When the lever is in "set" position, latching engagement between the pawl 17 and ratchet sector 9 can be released by slight back-pull of the lever which will tend to turn the sector 9 in clockwise direction and thus rock the pawl in counter-clockwise direction.

The action of the pawl and sector may be likened to a pair of gears, one of which is discontinuous. To release from "set" position it is necessary to roll the gears out of engagement with each other.

The intermeshing teeth of the pawl and ratchet sector are of wave form or of somewhat of sinuous form.

The invention has been described herein more or less precisely as to details, yet it is to be understood that the invention is not to be limited thereby, as changes may be made in the arrangements and proportion of parts and equivalents may be substituted without departing from the spirit and scope of the invention.

The invention is claimed as follows:

1. A brake lever construction including a lever supported to swing, a pawl pivoted to said lever and having a series of teeth, a ratchet sector pivoted to said lever and having a series of teeth for meshing with the pawl teeth, the first tooth of the series of teeth of said pawl being offset with respect to a line through the centers of swing of said pawl and sector in such manner that the pawl and sector cooperate with toggle-like action to automatically release meshing engagement of the pawl and sector by rolling action of the meshed teeth when the lever is swung in setting direction and to effect meshed engagement when the lever tends to move in retrograde direction.

2. Lever construction including a lever supported to swing in force applying and retrograde directions, a pawl pivoted to said lever and provided with a series of teeth, a ratchet sector pivoted to said lever and provided with a series of teeth of greater extent than the pawl series for meshing engagement with said pawl, the first tooth of the pawl series being near but offset with respect to a line through the pivotal centers of said pawl and sector, the series of pawl teeth extending in a direction away from said line of center, the arrangement being such that the pawl and sector cooperate with toggle-like action to automatically relieve meshing engagement of the pawl and ratchet by rolling action of the meshed teeth when the lever is swung in force applying direction and to cause meshing engagement to lock the lever against movement in retrograde direction.

3. Lever construction including a lever supported to swing in force applying and retrograde directions, a pawl pivoted to said lever and provided with a series of teeth, a ratchet sector pivoted to said lever and provided with a series of teeth of greater extent than the pawl series for meshing engagement with said pawl, the first tooth of the pawl series being near but offset with respect to a line through the pivotal centers of said pawl and sector, the series of pawl teeth extending in a direction away from said line of center, link means connected to said sector to cause it to swing in angular direction counter to the direction of swing of said lever to thereby cause said pawl to swing away from meshing engagement with said sector by rolling action of the meshed teeth when the lever is swung in force applying direction and to cause said pawl to swing in the opposite direction and into meshed engagement with said sector by rolling action of the meshed teeth when the lever tends to swing in retrograde direction.

4. A brake lever construction including a ratchet pivoted to said lever and having a series of rounded teeth along an edge, a pawl pivoted to said lever and having an edge with a series of rounded teeth of like configuration and pitch for meshing with the ratchet teeth, said pawl being pivotally mounted in such manner that said pawl and ratchet cooperate with toggle-like action to prevent retrograde movement of the pawl with respect to the ratchet.

5. A lever of the pawl and ratchet type, a ratchet having an arcuately convex surface provided with teeth, a pawl having an arcuately concave surface provided with teeth of like contour and pitch to mesh with the ratchet teeth, said ratchet and pawl each being pivoted to said lever, means connected to said ratchet to swing it about its pivot as the lever is moved in use, the construction being such that the ratchet and pawl cooperate with toggle-like action to relieve meshing engagement when the lever is swung in one direction and to effect meshed engagement when the lever tends to move in retrograde direction.

HERBERT S. JANDUS.